United States Patent [19]
Chi

[11] Patent Number: 4,544,961
[45] Date of Patent: Oct. 1, 1985

[54] TRIPLEX DIGITAL MAGNETIC RECORDING AND REPRODUCING SYSTEM
[75] Inventor: Chao S. Chi, Cupertino, Calif.
[73] Assignee: Sperry Corporation, New York, N.Y.
[21] Appl. No.: 528,387
[22] Filed: Sep. 1, 1983
[51] Int. Cl.[4] .......................... G11B 5/09; G11B 5/02
[52] U.S. Cl. .......................... 360/40; 360/44; 360/57; 360/66; 340/347 DD
[58] Field of Search .................. 360/40, 57, 44, 66, 360/68; 375/22, 17; 340/347 DD

[56] References Cited
U.S. PATENT DOCUMENTS 2,894,796  11/1953  Reynolds ........................ 360/68
4,190,868   2/1980  Moulin .......................... 360/1
4,470,081   9/1984  Chi ............................. 360/43

Primary Examiner—Raymond F. Cardillo, Jr.
Assistant Examiner—Alyssa H. Bowler
Attorney, Agent, or Firm—Howard P. Terry; Arnold L. Albin

[57] ABSTRACT

A quaternary saturated digital magnetic recording system for enhancing information entropy provides an effective bit density increase of 100% or more over the MFM code. In the simplest implementation, groups of two input binary bits are mapped into one data cell, preferably into four combinations of long or short breaks and positive or negative polarity, with the break optionally centralized within the data cell for self-clocking. A system for reproducing the recorded information provides a peak detector, responsive to the recorded signal, coupled to pulse polarity and break width detector circuitry, with an internally synchronized clock, for remapping the recorded data into binary format.

17 Claims, 8 Drawing Figures

TRIPLEX DIGITAL MAGNETIC RECORDING AND REPRODUCING SYSTEM

BACKGROUND OF THE INVENTION

1. Field of the Invention

The present invention relates to encoding methods and apparatus for digital magnetic recording systems and particularly to systems for saturation recording of closely packed data. The invention is described herein with reference to a system utilizing quaternary data encoding with freedom in selection of three independent variable characteristics.

2. Description of the Prior Art

It has been recognized in the art of magnetic recording that information density stored on the medium may be enhanced by packing magnetic flux transitions as closely as possible. However, as data is compressed in recording, interaction between successive bits at high density results in intersymbol interference and nonlinear distortion. For a given transducer/medium interface, which dictates the maximum flux density attainable, improved coding methodology derived from information theory and modern communications techniques has been applied successfully to provide effective bit density increase over a conventional encoding methodology. The "code efficiency" (CE) defined as the ratio between effective bit density and actual flux density, is thereby increased.

In digital magnetic recording, most conventional codes such as Double Frequency (DF), Modified Frequency Modulation (MFM or Miller), etc. convey the original information exclusively via the recorded flux transition positions; during data recovery the encoded transition position is found from the peak (or zero-crossing after differentiation) of the read signal. See, for example, N. D. Mackintosh, *The Choice of a Recording Code*, IERE Conf. Proc. No. 43, p. 77 (1979). In these codes, the flux transition alternates as it traverses the recorded bit string. Only the precise location, not the transition polarity, can be used to convey information in the present day saturated digital magnetic recording systems. The Three Position Modulation (3PM) code invented by G. Jacoby and described in U.S. Pat. No. 4,323,931, issued Apr. 6, 1982, which gives a 50 percent code efficiency improvement over MFM by re-distribution or modulation of flux transition locations (CE=1.5), is essentially a member of the one-variable runlength limited code group—in terms of degrees of freedom available in recorded signal variables for information encoding. One variable code groups, such as the above, operate on the principle of encoding the input data on position variations. The present invention, however, is a member of the group codes, whereby groups of bits are coded with unique patterns. Heretofore the group codes conveyed the original information either on position and waveshape of recorded flux transitions. (Ternary Data Encoding System as disclosed in U.S. patent application Ser. No. 260,248, filed May 5, 1981, in the name of G. V. Jacoby and M. Cohn), or on the polarity and presence or absence of a break (as disclosed by C. S. Chi, U.S. patent application Ser. No. 339,352, filed Jan. 15, 1982, Controlled Return to A.C. Digital Magnetic Recording and Reproducing System). Said Ser. No. 260,248 and Ser. No. 339,352, both assigned to the assignee of the present invention, give a potential 50% density improvement over MFM, and can be called "two-variable" codes since two independent degrees of freedom are available for original information encoding. While a two-variable code provides enhanced efficiency over the one-variable codes, more efficient three-variable codes have heretofore not been available.

It is a compelling requirement that any encoding methodology used provides self-clocking; that is, synchronization pulses which can be derived directly from the readback pulses, for high data reliability. Since the data is recovered relative to a time oriented window, as the data packing density is increased, the tolerance in timing error decreases. Thus, coding schemes may impose run length constraints, so that where the clock signal is derived from the recorded transitions long runs of binary 0's, which do not result in transitions, are precluded, thus avoiding drift of the timing clock. The NRZ code, for example, cannot be used directly in modern magnetic recording systems due to the lack of self-clocking and its demand on extended low-frequency response for "worst case" data patterns of uninterrupted strings of 1's or 0's.

SUMMARY OF THE INVENTION

The present invention has the potential for permitting three-variable encoding and further improves the capacity of a magnetic recording system. It is particularly adapted to enhancement of the Controlled Return to A.C. (CRA) recording system. According to the invention, data is encoded in the TRIPLEX format as a series of interruptions or breaks embedded in an otherwise continuous alternating flux reversal signal of variable breakwidth (providing variable amplitude on readback), polarity, and pulse position independently and collectively for original information mapping. As in the CRA recording system, the alternating flux reversal signal provides an override requirement for erasing the medium.

In a recording system embodying the invention, groups of two input binary bits are mapped into one data digit or cell where the break is optionally disposed at the center of the cell to provide self-clocking. Preferably the four combinations of two binary bits are mapped into four distinct combinations of long or short breaks with positive or negative polarity. The phase of the alternating flux reversal signal is controlled to provide coherent polarity at the leading and trailing edges of the breaks.

In a system for recovering information recorded on the magnetic medium in the encoded format, a reproducing head provides a train of serial pulse pairs responsive to the recorded information. A peak detector, responsive to the output signal, feeds circuits for resolving pulse pair peak-to-peak spread and pulse pair polarity to remap the encoded data into binary format corresponding to the input binary data which was recorded.

DESCRIPTION OF THE PREFERRED EMBODIMENT

Figures 1, 4:
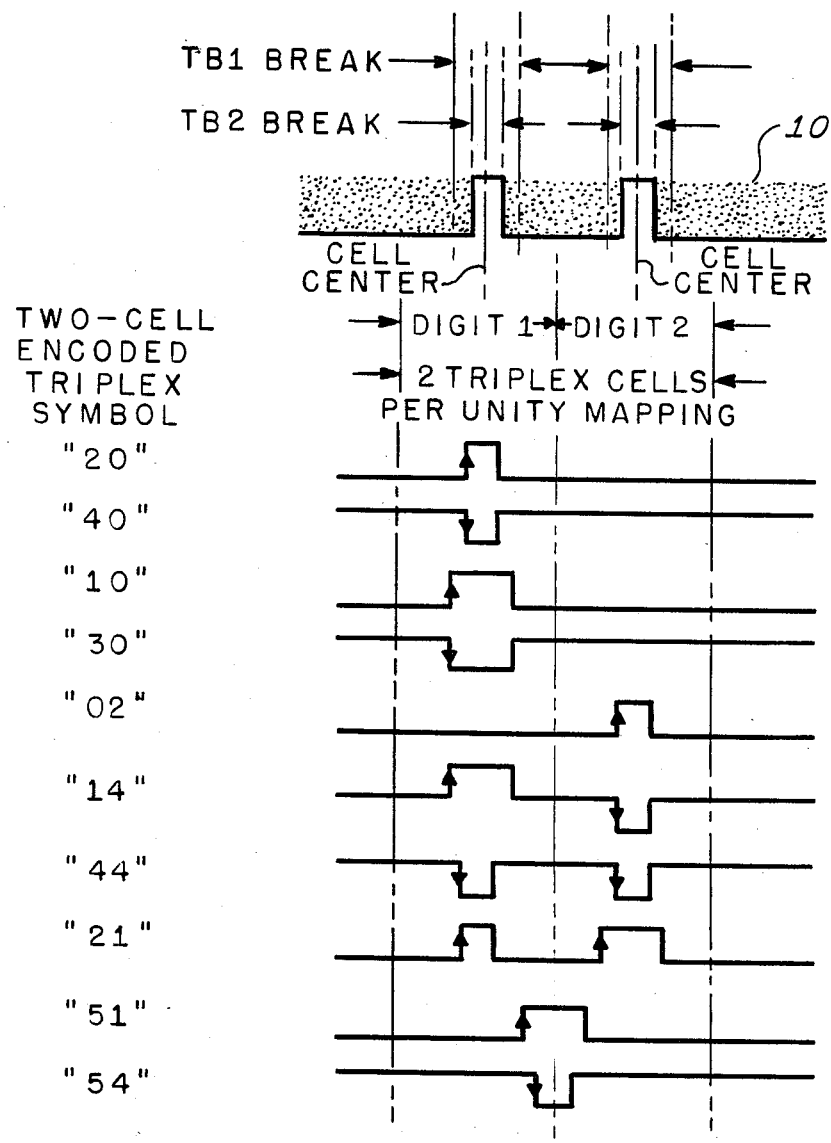
FIG. 1 is a truth table illustrating the logic implemented by the TRIPLEX-to-binary conversion with a one-cell structure.
FIG. 4 is a write waveform diagram showing ten of 28 possible TRIPLEX encoding combinations with a two-digit TRIPLEX structure, capable of a code efficientcy 2.42, embedded in the A.C. erasure signal.

Before proceeding with a detailed description of a presently preferred embodiment for carrying out the principles of the invention, reference will first be made to FIGS. 1 through 4 to provide further explanation of the manner in which the aforestated advantageous features of the invention are achieved. The encoded data is hereinafter referred to as TRIPLEX data. Referring to FIG. 1, there is shown a truth table illustrating the conversion between binary and TRIPLEX data. The two input binary bits $B_0$ and $B_1$ provide four possible combinations, designated by the 0 and 1 symbols. Two different TRIPLEX breakwidths are chosen, (also designated by 0 and 1) which, with available positive and negative polarities (also shown as 0 and 1) provide a corresponding choice of four within one TRIPLEX cell symbols. Thus, according to the invention, input data in the form of a series of binary bits is encoded into a highly complex TRIPLEX form. This quaternary information can now be recorded via a positive-going break, a negative-going break, and with a choice of two selected breakwidth durations. It should be understood that the above example is merely illustrative and shall not be construed as limiting since additional TRIPLEX code symbols may be obtained by varying the break position and using multiple TRIPLEX cells, as shown in FIG. 4.

Figure 2:
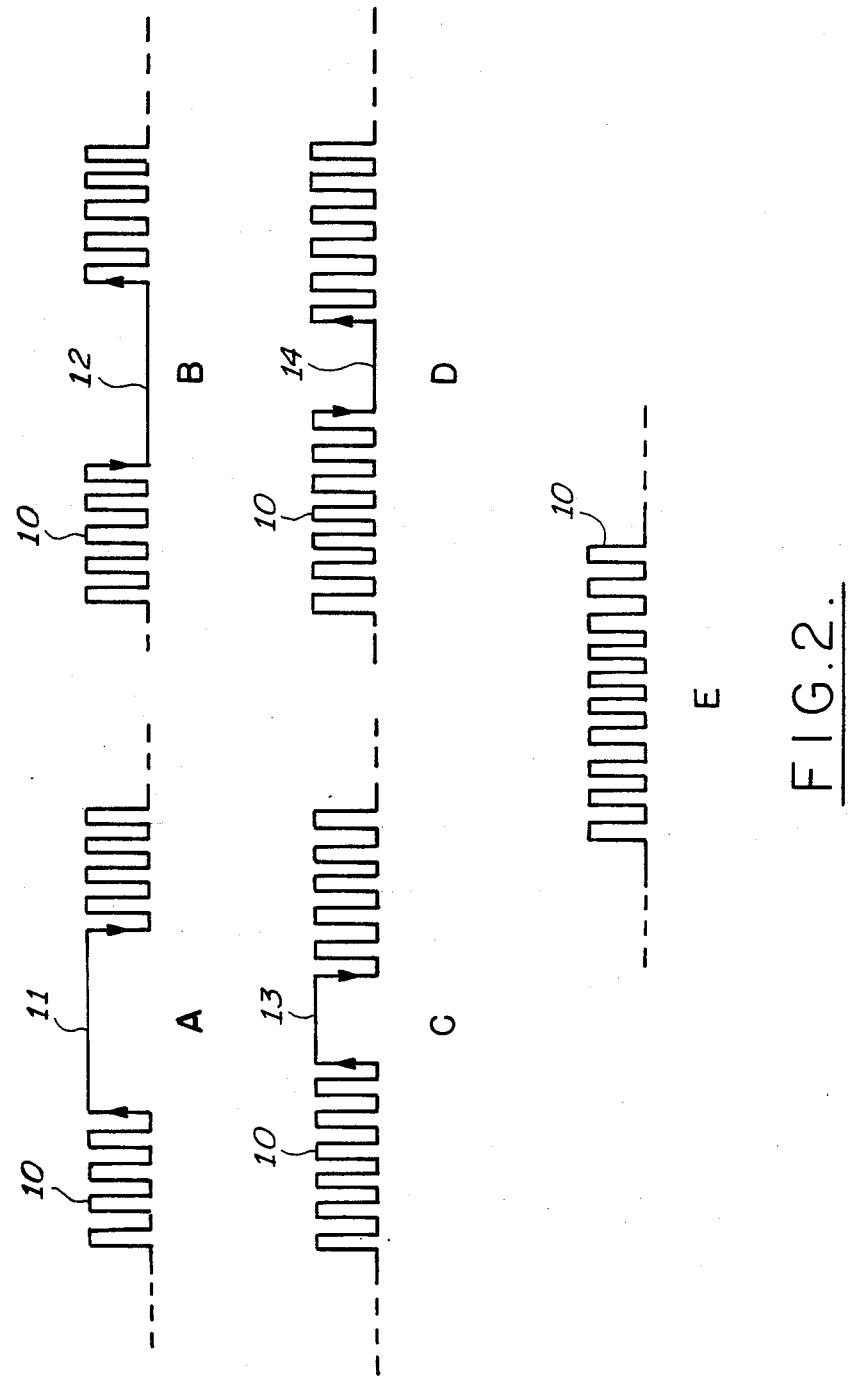
FIG. 2, featuring A-E, is a write (record) waveform diagram of four possible TRIPLEX digit conditions embedded in an alternating flux reversal signal.

Referring now to FIG. 2, waveforms illustrating the underlying concept of the present invention are shown. One TRIPLEX digit with associated alternating flux reversal signal comprises a TRIPLEX cell. For each TRIPLEX cell a continuous high frequency flux reversal signal, denoted by reference numeral 10, is applied to the write head except at the information bearing locations or "detents" optionally centered in the cell. At the detents, the flux reversal signal is interrupted for a predetermined time interval, having the effect of recording a break (or pulse doublet in readback) on the medium. A positive break is generated by interrupting the flux reversal signal on a positive going edge thereof and resuming the signal at a negative going edge. Conversely a negative break is generated by interrupting the flux reversal signal on a negative going edge thereof and resuming the signal on a positive going edge.

For example, FIG. 2-A shows a positive long break denoted by reference numeral 11. A negative long break is denoted by reference numeral 12 in FIG. 2-B. FIGS. 2-C and 2-D show corresponding positive and negative short breaks at 13 and 14, respectively. FIG. E shows the condition of absence of a break.

In the preferred embodiment of the invention, the breaks are constrained to occur coherently at regularly occuring detents on the medium, central in the TRIPLEX cell. The leading edges and trailing edges of the breaks occur synchronously with respect to the high frequency alternating flux reversal signal. In order to attain freedom of recording directionality the alternating signal is effectively shifted in phase in a manner to be described so that TRIPLEX cell boundaries occur in synchronism with the high-frequency clock.

Figure 3:
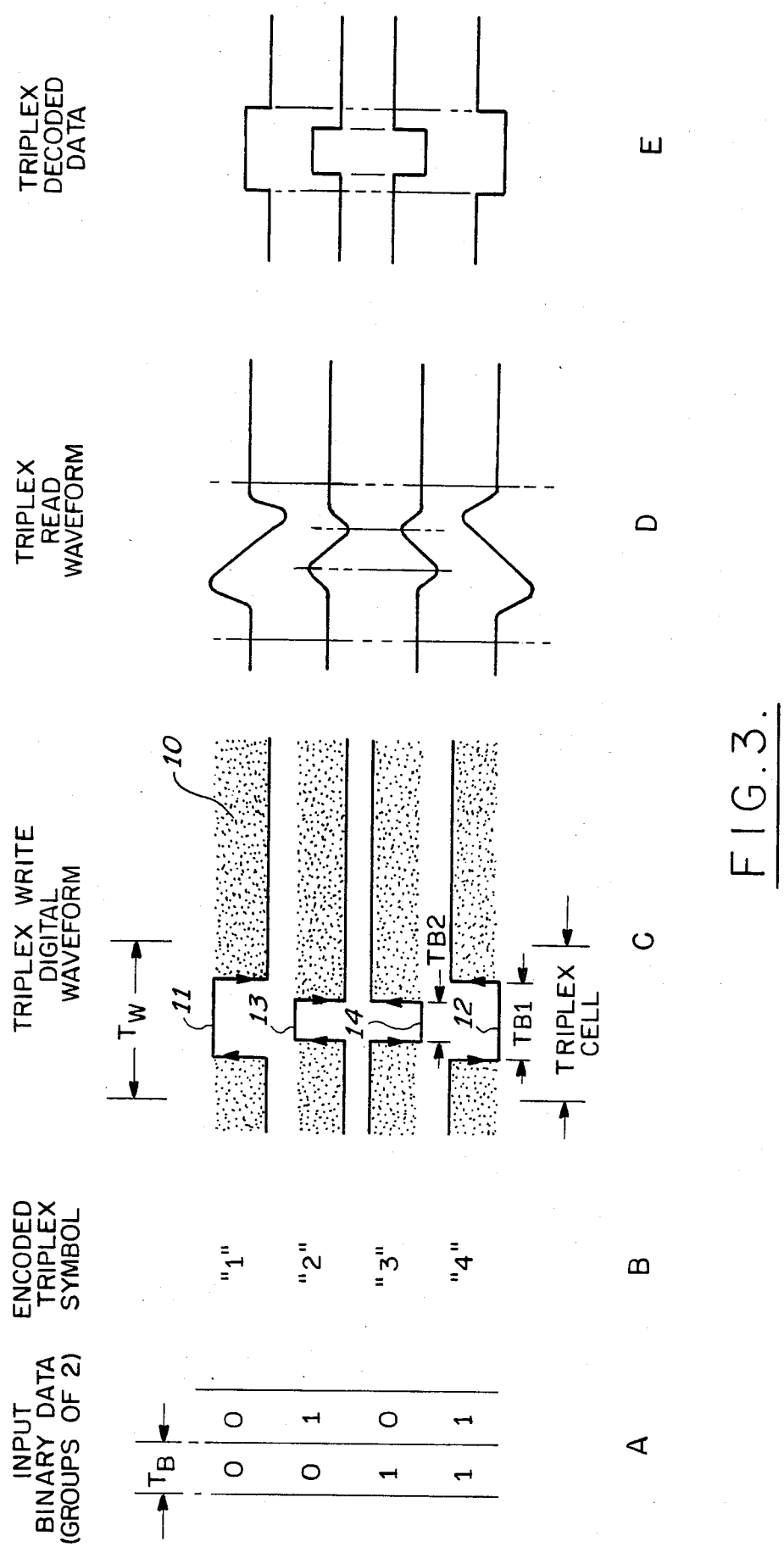
FIG. 3, featuring A-E, is a waveform diagram illustrating the mapping of binary data bits into TRIPLEX write waveforms and the resulting read waveforms.

Referring now to FIG. 3, the application of the preferred coding scheme will be explained. Groups of two input binary bits are mapped into one directional TRIPLEX digit, each TRIPLEX digit being conveyed as a positive or negative break and as a short or long break. The mapping is preferably selected such that each TRIPLEX cell has one controlled interruption centrally disposed therein although other locations may be used for additional information capacity. The four combinations of two binary input digits are delineated in column 3-A with the corresponding TRIPLEX symbols 1 through 4 adjacent thereto at 3-B. It is appreciated that the correspondence between the TRIPLEX symbols and the bit patterns of the input binary data can be arbitrarily chosen for ease of implementation.

The TRIPLEX write digital waveforms illustrated at FIG. 3-C adjacent the encoded TRIPLEX symbols depict the preferred mapping from binary to TRIPLEX code. It is appreciated that since each TRIPLEX break can be positive, negative, long or short, there are four possible TRIPLEX break patterns for a single cell. The case of break absent is optionally discarded to enhance self-clocking. This encoding results in extremely stable self-timing recovery apparatus. In a manner similar to that denoted above with respect to FIG. 2, the high frequency alternating flux reversal signal, short and long positive TRIPLEX breaks and short and long negative TRIPLEX breaks are denoted by reference numerals 10-14.

As further illustrated in FIG. 3, the spacing between adjacent detents defining a TRIPLEX cell is $T_W$. The input binary data spacing is denoted as $T_B$. Since two binary data bits map into one quaternary TRIPLEX digit, $T_W$ can be 2.0 $T_B$ for equivalent information density mapping. Under this condition, the TRIPLEX pulses are spaced twice the distance of the corresponding binary pulses, resulting in improved intersymbol interference characteristics. Thus, if $T_W = T_B$, a 2:1 information density increase is achieved.

With continued reference to FIG. 3, the readback signal derived from a differentiating readhead is illustrated adjacent each TRIPLEX write pattern. The readback doublet signal comprises a series of pulse pairs, with an amplitude and related timing dispersion determined by the breakwidth of the recorded transitions, and polarity by the positive and negative edges of the leading and trailing edges of the break pulse.

The readback doublet signal of a positive break is a pulse pair beginning with a positive pulse and followed by a negative pulse. The readback signal of a negative break is a pulse pair beginning with a negative pulse and followed by a positive pulse. It is furthermore appreciated from the read waveform that the high frequency alternating flux reversal signal results in a zero D.C. readback level. Theoretical and experimental works verified that any high frequency alternating flux pattern beyond the bandwidth of the read channel will produce zero output signal. This property permits the flexibility of phase synchronization via frequency adjustment. Illustrated adjacent the TRIPLEX read waveforms are conceptual representations of the decoded data at E.

Additionally, encodings of groups of binary bits greater than groups of two into TRIPLEX cells comprising more than one TRIPLEX digit may also be utilized for further increased information density at the expense of system complexity in practicing the invention. For example, assume that two TRIPLEX cells are chosen as a mapping unit to encode the original information. From probability theory, there can be 28 unique identifiable symbols available for the TRIPLEX as opposed to 4 in the conventional binary system. FIG. 4 shows some of the available unique identifiable symbols via combinations between the two breakwidths TB1 and TB2 (resulting in different amplitudes in the playback) and freedoms of position and polarity. With a mapping unit of two TRIPLEX cells, a 242% increase in bit density may be obtained. The condition of absence of one of the two breaks may optionally be included for improved coding efficiency without sacrifice of self-clocking. By limiting the choice of break position to a single location centered in the TRIPLEX cell, and using but one cell to form the TRIPLEX mapping entity, a code efficiency of 2.0, representing 100% increase in density over the MFM code may still be achieved.

The operation of a preferred embodiment of the invention will now be described with reference to FIGS. 5 through 8.

Figure 5:
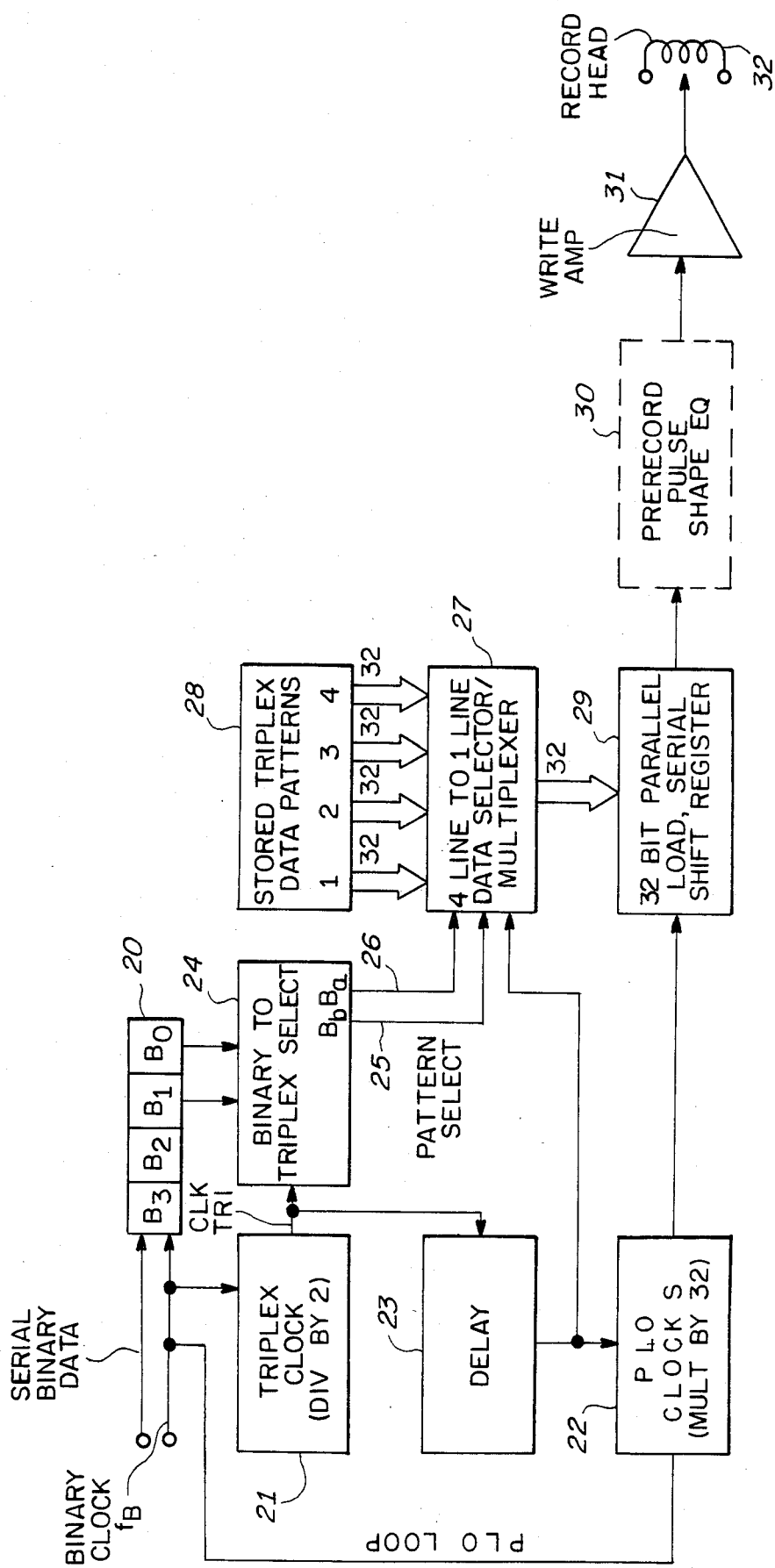
FIG. 5 is a block diagram implementation of the write system of the present invention for the one-digit TRIPLEX encoding.
Figure 6:
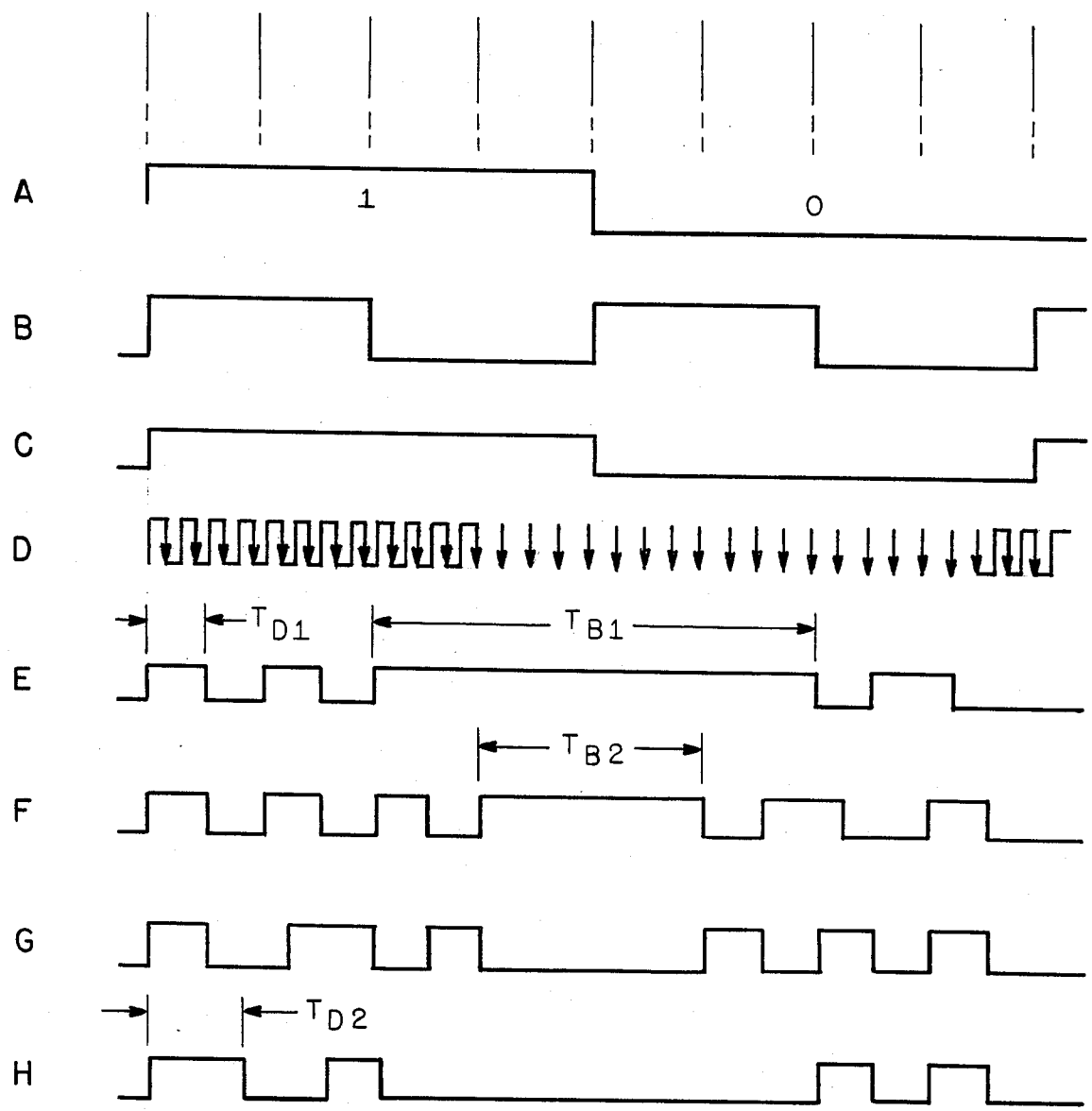
FIG. 6, featuring A-H, is a waveform diagram showing the TRIPLEX write waveforms for the one-digit TRIPLEX encoding.

Referring to FIG. 5, a schematic block diagram of a preferred embodiment of the write portion of the system of the present invention is illustrated. Reference may also be made to FIG. 6 which depicts clock and TRIPLEX waveforms utilized in the apparatus of FIG. 5. Serial binary input data is applied to shift register 20 and is shifted through the register 20 by a binary input clock $f_B$. Exemplary binary data is illustrated on line A of FIG. 6 and the binary clock $f_B$ is illustrated on line B of FIG. 6. Preferably, the shift register is a four stage register, the stages denoted as $B_0$ through $B_3$, respectively of FIG. 5. It is appreciated that $B_3$ is the latest binary bit to occur and $B_0$ the earliest.

The binary clock $f_B$ is also applied to a frequency divider 21 for generating the TRIPLEX clock rate CLK TRI, which is synchronized at the rate of one TRIPLEX count for every two binary clock counts. Thus, the TRIPLEX clock will give one loading command to TRIPLEX Select block 24 for every two input binary bits. The TRIPLEX clock 21, CLK TRI, has a frequency one-half that of $f_B$ and occurs in phase therewith. The TRIPLEX clock is illustrated on line C of FIG. 6. A sampling clock CLK S is illustrated on line D of FIG. 6 and is shown in block 22 of FIG. 5. CLK S occurs at a rate 16 times that of $f_B$ and is generated by multiplying CLK TRI by a factor of 32 and phase inverted with respect to CLK S. Clock S, as noted, is delayed one-half cycle in block 23 and operates in a phase-lock-loop mode coupled to binary clock $f_B$. In line D of FIG. 6 the Clock S is represented by phasing arrows delayed and inverted with respect to the leading edge of the TRIPLEX clock.

As described above, the binary clock $f_B$ controls the shifting of the serial binary input data through the shift register 20. The stages $B_0$ and $B_1$ store the current two binary bits to be mapped into the current TRIPLEX digit. Preferably the bits $B_2$ and $B_3$ provide one TRIPLEX digit as a lock-ahead option. After every two shifts of binary data through register 20, the TRIPLEX clock CLK TRI strobes the two bits extant into a parallel buffer register at block 24.

The binary-to-TRIPLEX select block 24 provides logic control signals $B_a$ and $B_b$ in accordance with the binary input bits $B_1$ and $B_0$. The logic block 24 is implemented to provide the $B_a$ and $B_b$ signals in accordance with the Table of FIG. 1. Thus, $B_a$ and $B_b$ respectively correspond to the breakwidth and polarity forming a unique TRIPLEX cell for each pair of input serial binary bits $B_0$ and $B_1$. It is appreciated that the binary to TRIPLEX select logic 24 may be implemented, for example, by conventional combinational logic or ROM table look up procedures so as to provide the signals as indicated in FIG. 6. In the preferred embodiment, writing is accomplished by encoding the incoming binary bits in TRIPLEX digits, and selectively commanding from storage a predetermined train of pulses for generating the continuing alternating bits with controlled breaks of desired duration and polarity, to energize the magnetic write head in serial data form. Four TRIPLEX patterns are stored in memory in binary form in block 28, organized as four 32-bit words, sixteen 8-bit words, or the equivalent. Memory is preferably of the programmable read only type (PROM), although other memory systems are also applicable.

The four stored TRIPLEX data patterns, representing four unique and exclusive digital write waveforms, are shown in FIG. 3C. These waveforms are shown together with an associated high frequency alternating flux reversal signal component in lines E through H of FIG. 6. Note that line E preferably consists of a leading alternating signal of two cycles, and a trailing alternating signal of one end one-half cycles at a nominal alternating signal frequency of four times the binary clock, synchronized with the binary clock; and with a central region defining a positive long break $T_{B1}$, four alternating signal cycles in duration. Line F may consist of a positive short break $T_{B2}$, two alternating signal cycles in duration, with leading and trailing alternating signals respectively three and two and one-half alternating signal cycles in length. Line G provides a short negative break. Line H provides a similar structure for the long negative break. In order to provide proper phase synchronization with adjacent TRIPLEX digits, the leading and trailing alternating signal pulse trains are adjusted so as to provide a suitable coherent phase shift to match differing breakwidths or oppositely polarized breaks. Thus, for example, it may be seen that pulse $T_{D2}$ in line H of FIG. 6 is longer by one clock S cycle than pulse $T_{D1}$ of line E.

The pulse sequences stored in PROMS 1-4 provide the high frequency alternating signal encoded with the selected breakwidth and polarity, thus providing a high frequency alternating flux reversal signal with a polarity controlled interruption. The availability of the centralized break within each cell provides effective self-timing for data recovery.

The stored TRIPLEX data patterns in block 28 are connected by four 32-bit busses to data selector/multiplexer 27. Block 27 is comprised for example, of 16 dual-4-line-to-1 line data selectors/multiplexers. This array permits multiplexing one of the four stored TRIPLEX data patterns from four 32-bit input busses to a single 32-bit output bus in response to the binary input command on lines 25 and 26 from TRIPLEX Select block 24, each of the four input combinations 00, 01, 10, 11 selecting a predetermined data pattern. The data selector 27, in response to the two-bit command from TRIPLEX select block 24, transfers the data in memory from one of the four selected data patterns to register 29. The transfer occurs at the TRIPLEX clock rate, or once for every two input binary bits, delayed by block 23 by one-half cycle, referred to clock CLK TRI. The delay is provided to prevent a critical race condition and insure that all stored data has been transferred to register 29 before readout is initiated. Register 29 comprises a 32-bit parallel load and serial shift register, and may be constructed from four 8-bit shift registers. Thus, each time TRIPLEX select 24 is triggered by TRIPLEX clock 21, which occurs once for every two binary clock pulses, a corresponding one of PROMs 1 to 4 is selected. The delayed clock 23 strobes the multiplexer 27 after sufficient time for settling, whereby pattern data in the selected PROM from block 28 is loaded into the shift register 29. The data in the shift register 29 is then clocked out by clock S at a rate, for example, thirty-two times that of the clock rate of the multiplexer and phase locked to binary clock $f_B$. Thus, for each two binary input bits, one TRIPLEX digit will be selected and the corresponding data on the selected PROM stored in the load-and-shift register 29. During the corresponding time interval, the previous thirty-two bit load will be read out into the write amplifier 31. Since the TRIPLEX clock operates at one-half the binary clock rate, the Clock S will provide 16 clock pulses for each input binary bit, or 32 clock pulses for a two-bit binary sequence corresponding to one TRIPLEX digit. Thus, serial register 29 will unload the 32 bits stored therein representing a selected TRIPLEX pattern in serial form constituting a pulse train of a properly phased alternating flux reversal with an embedded polarized break of predetermined duration. Clock S is phased locked to the input binary clock $f_B$, thus assuring that the flux reversal signal and break waveforms are properly phased with respect to sequential TRIPLEX digits.

The serial data from register 29 is now directed to write amplifier 31, where the current is boosted to the drive record head 32 in the usual manner known to those skilled in the art. The write amplifier is of the conventional type providing drive current of the order of 200 mA to the record head 32. A waveshaping circuit 30 may optionally be interposed between the register 29 and write amplifier 31 for shaping the breaks and/or the adjacent alternating pulses for providing enhanced performance.

The read system of the present invention will now be described in detail with respect to FIGS. 6, 7, and 8. Data recovery is obtained by analyzing the doublet pulse amplitude and polarity to reconstruct the TRIPLEX waveform, which is then decoded into binary format by a look-up table. Recovery of the recorded data requires that a timing signal be derived from the data itself to provide self clocking, which can be provided by identifying the position of the zero-crossover of each doublet. The signal is also processed to discriminate between the amplitude levels of the doublets, from which breakwidth information can be recovered, and to ascertain the polarity of each doublet. The breakwidth and polarity signals, synchronized to the derived clock pulse, are then converted back into binary form for reading out the recovered data.

Figure 7:
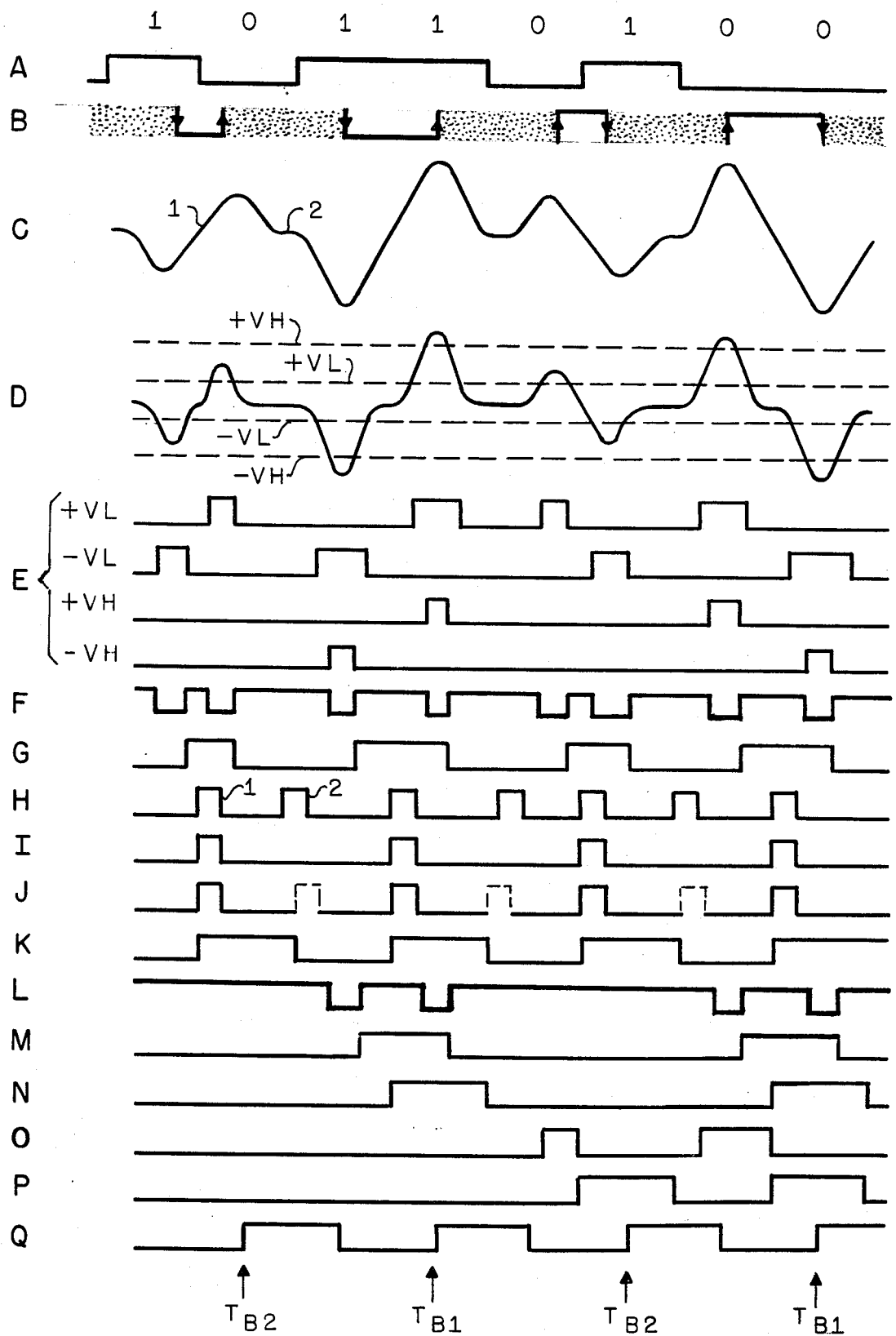
FIG. 7, featuring A-Q, is an example illustrating the relationships between waveforms of the data recovery system of the present invention.

Line A of FIG. 7 illustrates an arbitrary train of binary input data and line B illustrates the TRIPLEX write waveform corresponding to the input data of line A using the table of FIG. 1. Lines C through Q represent waveforms observed with reference to FIG. 8. Referring now to FIG. 8, which shows a detailed embodiment of the readback apparatus of the invention, with continued reference to FIG. 7, a read head 40 responsive to the recorded TRIPLEX signal provides, via a conventional preamplifier 41, TRIPLEX read waveform such as that illustrated on line C of FIG. 7. Line C illustrates the read signal corresponding to the TRIPLEX write signal of line B as observed with a differentiating readhead. Note that the high frequency alternating flux reversal signal essentially provides zero readback output and, therefore, the data is conveyed by the TRIPLEX break locations, polarities, and pulse amplitude related to the recorded breakwidth. It should be appreciated that breakwidth variations in the record waveform are observed as amplitude changes by the readback circuitry; here the curves are optionally restricted to show two levels of amplitude $V_H$ and $V_L$ corresponding to two breakwidths for reliable amplitude discrimination in the readback system. Since self-demagnetization is a characteristic of magnetic recording at high linear desnities, appropriately predetermined breakwidth during write produces the optimum readback pulse-pair amplitudes as well as the pulse-pair width which benefits signal discrimination.

In order to enhance signal-to-noise ratio and resolution, the read signal from the preamplifier 41 is passed through conventional spectral equalization and bandpass filtering circuitry 42. The equalized and filtered signal from the circuitry 42 is applied to a post amplifier 43, and is illustrated on line D of FIG. 7.

The AGC of the post amplifier 43 provides signal amplitude stability and thus threshold stability of the retrieved signal, which may vary from track to track. The AGC circuitry is also used to detect average signal amplitude and to derive the required threshold voltages for level detection. The post amplifier 43 provides signals as shown in line D of FIG. 7, to threshold generators 54-57 for use in establishing thresholds $+V_{LR}$, $-V_{LR}$, $+V_{HR}$ and $-V_{HR}$, respectively. Threshold generators 54-57 may each be comprised of a full-wave rectifier with voltage divider or a peak sample-and-hold-detector with an output attenuator. Each of the four threshold generators is biased to establish a particular voltage level based on the positive or negative detected peaks as shown in waveform D of FIG. 7. The resulting detection thresholds $\pm V_{LR}$ and $\pm V_{HR}$, which are preferably set at 50% and 75%, respectively, of the equalized peak read voltage to permit ready discrimination of the pulse width and polarity after suitable processing, are coupled to comparators 50-53. The DC levels thereby established are applied as a reference to each of the respective comparators 50-53. The output D of amplifer 43 is also applied to each of the comparators, as shown in FIG. 8. Thus, when the input signal D exceeds a pre-established bias level determined by the corresponding threshold generator 54-57, an output pulse $+V_L$, $-V_L$, $+V_H$ or $-V_H$ will be generated as shown in lines E of FIG. 7. Note that each pulse is centered on the peak of the corresponding waveform shown in line D, and that the pulse duration varies with the pulse amplitude. The comparators thereby provide a series of rectangular pulses of uniform amplitude corresponding to positive and negative breaks for each of the two breakwidths. Note that all resulting waveforms have positive polarity and the respective pulses have a duration proportional to the equalized amplitude of read data line D.

The outputs of the comparators 50-53 are applied to NOR gates 58 and 59 to provide clock signals for type "D" flip-flops 60 and 66. Pulse signals from the comparators 50 and 51 are combined in NOR gate 58 which forms a string of pulse pairs to toggle triggerable "D" flip-flop 60. The flip-flop 60, triggered at the trailing edges of the pulses, is used to provide a zero-crossing enable signal, waveform G of FIG. 7, at its output Q. Input waveform F is the NOR combination of waveforms $+V_L$ and $-V_L$ applied to clock input C. By virtue of the feedback connection between terminals D and Q, the D flip-flop changes state once for every positive-going clock pulse at input C.

Virtually every contemporary magnetic recording device used as storage for computers has a data structure that includes a preamble or synchronization area preceding the actual data. This preamble consists of a constant frequency pattern whose function is to lock in any phase-locked clock, and also includes a "start synchronization pattern" immediately preceding the actual data, whose function is to preset (or reset) registers and/or flip-flops to initiate proper data recovery as required for proper data detection.

Figure 8:
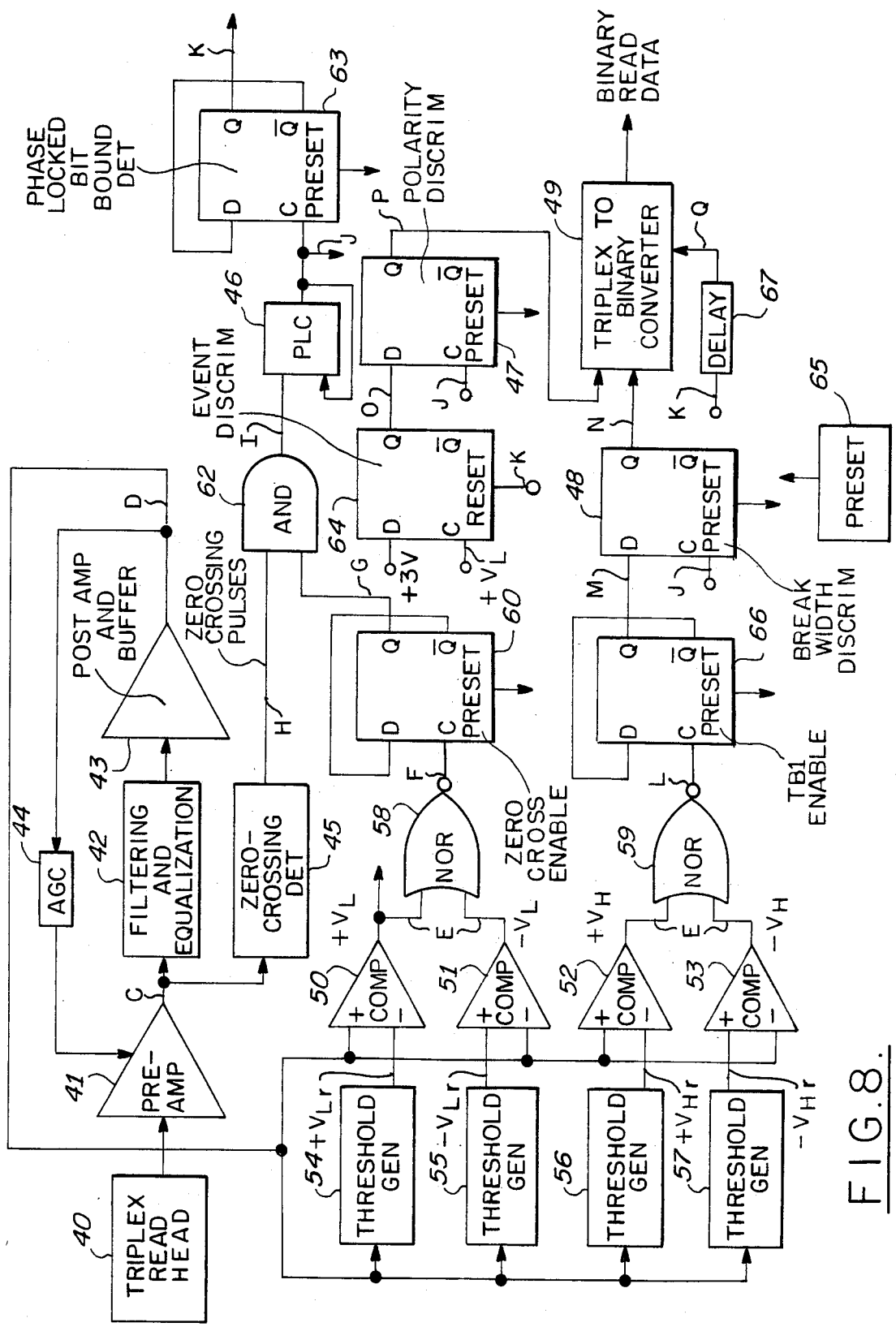
FIG. 8 is a block diagram implementation of a detailed embodiment of the data recovery system.

FIG. 8 shows such a preset block 65 as applied to corresponding terminals of the logic devices. The flip-flop 60 is initialized to its preset state by an initializing signal from preset 65 applied to the "preset" terminal as shown. The Q output of the flip-flop 60 is illustrated on line G of FIG. 7. The positive going edges of the pulses from the NOR gate 58 trigger flip-flop 60. Waveform G, derived from F, provides a sequence of pulses centered on the zero crossings of waveform D, with pulse widths determined by successive zero-crossing time intervals.

In line H of FIG. 7 the centers of the zero-crossing pulses are determined by defining the pulse-pair transition center or crossover from line C. Zero-crossing detector 45 may be comprised of a conventional comparator with a 0 $V_{DC}$ reference. When signal C passes through 0 $V_{DC}$, detector 45 will provide a pulse output. Essential elements required in this circuit are that it changes its level sharply at the time at which the input waveform crosses the reference level. For this application, the reference is established at the zero level D.C. voltage of waveform C of FIG. 7, repesenting the center of the TRIPLEX pulse. Thus, at each zero crossing of waveform C, shown typically by the notations 1 and 2 thereon, a pulse will be generated as shown in line H of FIG. 7. It will be appreciated that zero-crossing pulses derived from TRIPLEX data may create undesired outputs at the adjoining cell boundaries which will lead to ambiguities in the synchronizing pulses. Therefore, the apparent zero-crossing pulses are processed to remove this ambiguity. Thus, for example, from line H, zero-crossing pulses derived from line C are seen to occur both at the center of the break (valid) and the interface between adjoining breaks (invalid). Typical crossings of this type are shown at 1 and 2, respectively, on line C and H. The zero-crossing enable pulse shown on line G, however, which corresponds to the true breaks in the TRIPLEX data, when combined with the output H of zero-crossing detector 45 in AND gate 62 furnishes an output pulse only at the coincidence of the two inputs, thereby providing a train of valid zero-crossing pulses. This pulse train is shown at line I. Note that the leading edge of each pulse is synchronized with the center of the respective break thus identifying the center of the TRIPLEX cell.

Self-timing of the read-back data is provided by phase-lock clock 46 which is synchronized by the zero-crossing pulses of the recorded TRIPLEX data. The phase-lock clock 46 is derived by multiplying the input rate by two, as shown at line J. The output J is applied as a clock signal to bit boundary detector 63, a type "D" flip-flop. The operation of this flip-flop is similar to that of flip-flop 60. The leading edge of the output pulse K defines the center of each break. The K pulse output, obtained at terminal Q of flip-flop 63, will be used in a manner to be described to set event discriminator 64 for ascertaining break polarity.

In reconstructing the binary read data from the TRIPLEX form, it is necessary to identify both the polarity and the breakwidth of the encoded TRIPLEX data. Break position has been optionally predetermined at the center of the TRIPLEX cell for this embodiment. Polarity identification is accomplished by the event discriminator 64 enabled by the polarity discriminator 47. Event discriminator 64 is a type D flip-flop. Its clock signal at C is taken from the $+V_L$ signal as shown in line E. The data terminal D is preset to logic 1. The Q output of discriminator 64 is coupled to the data input D of flip-flop 47, the polarity discriminator. A reset pulse for block 64 is obtained from the Q output of flip-flop 63, which is bit boundary clock waveform K. It may be seen that the positive reset pulse applied to discriminator 64 clamps the Q output (waveform O) at the zero level during the negative-going breaks. However, during the positive-going breaks, the Q output is enabled or set by the $+V_L$ pulse. Thus, the waveform on line O shows zero-level output during the negative going TRIPLEX breaks, and respective narrow and wide positive pulses during the narrow and wide positive-going TRIPLEX breaks.

Polarity discriminator 47 is a type D flip-flop clocked by the phase-lock clock output J. It may be seen that since the data line D is coupled to the Q output of block 64 (line O of FIG. 7), it is at zero during the negative going breaks, hence the polarity discriminator output P will also be at zero. When the data line D becomes high due to the presence of a positive pulse on line O, there is no change in the state of flip-flop 47 so long as the clock input also remains at zero. However, when a clock pulse occurs coincident with a pulse from line O, the polarity discriminator flip-flop 47 is triggered to produce a HIGH output at P. This output remains high until reset by the next clock pulse J, whereupon, the input data line D again being at zero, the output line at P also returns to zero. Upon the next coincident pulse of line O and the phase-lock clock pulse J, the sequence repeats itself. Thus, it is seen from waveform P that the polarity discriminator 47 provides zero output during the negative-going break and a positive output during the positive-going breaks, synchronized with the bit boundary clock. The output P of discriminator 47 is then fed into a data input of TRIPLEX-to binary converter 49. Referring now to $T_{B1}$ Enable type D flip-flip 66, the clock input, shown as waveform L, toggles the flip-flop on the trailing edge of each input pulse to the clock terminal C. Waveform L is derived from combining $+V_H$ and $-V_H$ in NOR gate 59. Thus, each pair of pulses defines a wide break, shown as $T_{B1}$ in FIG. 3. The feedback circuit from complementary output Q to data input D acts as previously described for flip-flop 60, changing state on each positive-going clock transition. The resultant output M, therefore, provides a LOW during any narrow break and a HIGH for a wide break.

The output M is applied as the data input to breakwidth discriminator 48. Discriminator 48 is toggled by clock input J from the phaselock clock 46. The result is to resynchronize the breakwidth pulse of M to occur at the center of the original TRIPLEX read data long break and the leading edge of phaselock clock 46, as shown in waveform N.

The output N from breakwidth discriminator 48 and the output P from polarity discriminator 47 are fed to TRIPLEX to binary converter 49. When triggered by TRIPLEX bit boundary clock output K, delayed by delay block 67 to provide waveform Q, the TRIPLEX data may be reconverted to binary data, as shown in the truth table in FIG. 1, to reconstruct the original binary input. The purpose of delaying the clock pulse K is to assure that the clock pulse leading edge is synchronized so as to sample at the midpoint of the binary input pulse A. This may be seen by a comparison of line Q of FIG. 7 as referred to line A.

Waveform P provides a ZERO for negative breaks and a ONE for positive breaks. Waveform N provides a ZERO for short breaks and a ONE for long breaks. Waveform Q supplies the clock input. Thus, for example, referring to FIGS. 1 and 3C, a TRIPLEX waveform showing a long, positive break will be represented by a 1,1 input to block 49, and provide a recovered binary output of 0,0 corresponding to the original input to the WRITE system. Converter 49 may be a conventional lookup table comprised of read only memory or comprised of conventional combinational logic.

While the invention has been described in its preferred embodiments, it is to be understood that the words which have been used are words of description rather than of limitations and that changes within the purview of the appended claims may be made without departing from the true scope and spirit of the invention in its broader aspects.

I claim:

1. A magnetic recording system for recording information on a magnetic medium, comprising:
    means for generating a substantially continuous alternating signal,
    means for applying said alternating signal to provide a multiplicity of magnetic flux reversals that substantially erases said magnetic medium,
    means for providing an interruption of said alternating signal at a controlled polarity and position thereof,
    said interruption comprising a break of predetermined duration corresponding to said controlled polarity embedded in said alternating signal,
    means coupled to said alternating signal for controlling the duration of said break by selecting at least two of a plurality of predetermined durations, and
    means for receiving and recording said interrupted alternating signal on said medium,
    said controlled polarity being defined by the direction of said alternating signal at the time of initiating said interruption, and said alternating signal being resumed after said break in an opposing polarity defined by the direction of said alternating signal at the time of resumption, said time of initiating said interruption and said time of resumption bounding said break corresponding to one of said predetermined durations.

2. The system of claim 1 in which said means for generating an alternating signal includes pattern storage means for storing a multiplicity of alternating signal and break patterns in accordance with a predetermined polarity and break duration of said interruption, each of said signal and break patterns constitute a predetermined TRIPLEX data pattern.

3. The system as set forth in claim 2, in which said predetermined TRIPLEX data pattern comprises an alternating signal with a break interposed therein, said break having a predetermined position with respect to said alternating signal, a predetermined polarity, and a predetermined duration, corresponding to one of said binary data words.

4. The system as set forth in claim 3, further comprising means responsive to said interrupted alternating signal recorded on said medium for providing a read signal, said read signal comprised of a positive pulse followed by a negative pulse when reading a break of positive polarity and a negative pulse followed by a positive pulse when reading a break of negtive polarity, and a zero level signal when reading said alternating signal, said read signal having a substantially greater peak-to-peak amplitude when reading a wide break than the amplitude of said signal when reading a narrow break.

5. The system of claim 4, further comprising means for detecting amplitude with respect to a predetermined threshold and polarity of said positive and negative pulses of said read signal,
    means responsive to said detection means and also responsive to said positive and negative pulses for determining a zero-crossing point defining the transition between said positive and negative pulses and for providing zero-crossing pulses,
    clock means responsive to said zero-crossing pulses for generating a read clock signal phase-locked thereto,
    means responsive to said phase-locked clock for determining the center of a break, and providing a pulse signal corresponding thereto,
    means responsive to said break pulse signal for providing a delayed clock pulse sychronized with said input binary bits,
    means responsive to said phase-locked clock and said detector means for discriminating said wide breaks from said narrow breaks,
    means responsive to said phase-locked clock and said detector means for determining the polarities of said detected positive and negative pulses of said read signal, thereby providing a break width signal and break polarity signal respectively, and
    remapping means responsive to said break width signal, said break polarity signal, and said delayed clock pulse for recovering the binary data corresponding to said breaks and remapping said data into said input binary bit format.

6. The system of claim 2 further comprising:
    binary data storage means for receiving binary data words each including at least two input binary data bits, and
    mapping means responsive to a group of a predetermined number of said binary bits for controlling the generation of each of said interruptions of said alternating signal, each interruption being of a polarity and of a break duration in accordance with said group of binary bits, said alternating signal and said interruptions constituting a train of encoded binary data, said mapping means coupled to said binary data storage means and responsive to said binary data words for producing digital control signals each representative of one of a predetermined plurality of TRIPLEX data patterns.

7. The system of claim 1, wherin a first TRIPLEX data pattern is represented by a long break of positive polarity between said alternating signals, a second TRIPLEX data pattern is represented by a narrow break of positive polarity between said alternating signals, a third TRIPLEX data pattern is represented by a narrow break of negative polarity between said alternating signals, and a fourth TRIPLEX data pattern is represented by a wide break of negative polarity between said alternating signals.

8. The system of claim 6, in which said mapping means comprises means for mapping groups of two input binary bits into a single TRIPLEX cell, said cell comprising an alternating flux reversal signal interrupted by a break of predetermined duration centered within said cell.

9. The system as set forth in claim 6, further comprising TRIPLEX data pattern selection means coupled to receive control signals from said mapping means and alternating signal and break patterns from said pattern storage means for selecting at least one of said TRIPLEX data patterns for producing said train of encoded binary data.

10. The system as set forth in claim 9, further comprising means for storing said train of encoded binary data in parallel form and reading out said train as data pulses in serial form.

11. The system as set forth in claim 10, further comprising binary clock means for providing clock signals coupled to said binary data storage means.

12. The apparatus as set forth in claim 11, further comprising divider means responsive to said binary clock signals for providing a pulse representative of a portion of said clock signals for synchronizing said mapping means.

13. The system as set forth in claim 12, further comprising means coupled to said divider means for delaying said synchronization pulse by a predetermined time interval with respect to said binary clock signals, phase-lock oscillator clock means, and means for providing a delayed synchronization pulse to said phase-lock oscillator clock means and said pattern selection means.

14. The system as set forth in claim 13, in which said phase-lock oscillator clock means comprises means also responsive to said binary clock signals for supplying timing signals to said means for storing said train of binary data.

15. The system of claim 14, further comprising equalizing means coupled to receive said data pulses in serial form to enhance the readback characteristics thereof by shaping the waveform of said data pulses and providing said shaped pulses to said recording means.

16. Apparatus for recording information on a magnetic medium, comprising:
means for receiving input binary bits,
binary data storage means for receiving binary data words each including at least two of said input binary data bits,
digital control means coupled to said binary data storage means and responsive to said data words for producing digital control signals each representative of one of a predetermined plurality of alternating flux reversal signal and break patterns,
pattern storage means for storing said plurality of alternating flux reversal signal and break patterns, comprising a first pattern represented by a long break of positive polarity between said alternating signals, a second pattern represented by a narrow break of positive polarity between said alternating signals, a third pattern represented by a narrow break of negative polarity between said alternating signals, and a fourth pattern represented by a wide break of negative polarity between said alternating signals, wherein each of said breaks is centrally disposed within said pattern,
pattern selection means coupled to receive control signals from said digital control means and alternating signal and break patterns from said pattern storage means for selecting at least one of said patterns for producing a train of encoded binary data comprising pulses of predetermined widths and polarities responsive to said alternating signal, said break width, and said polarity, including means for storing said train of binary data in parallel form and reading out said train as binary data in serial form,
means for receiving a pulse from binary clock means for synchronizing said binary data storage means, divider means, and phase-lock-oscillator clock means,
divider means responsive to said binary clock means for providing a pulse for synchronizing said digital control means and delay means thereto,
said delay means comprising means for delaying said divider synchronizing pulse by a predetermined time with respect to said binary clock means synchronization pulse, and for providing a delayed synchronization pulse to said clock and said pattern selection means, said phase-lock oscillator clock means responsive to said delay means and said binary clock means, for supplying timing signals to said means for storing binary data in parallel form and reading out said data in serial form, and
write amplifier means for driving a recording head and responsive to said serial data.

17. The apparatus as set forth in claim 16, further comprising apparatus for reading information recorded on said magnetic medium, including:
reading means responsive to said information recorded on said medium for providing a read signal, said signal comprising a positive pulse followed by a negative pulse when reading a positive break and a negative pulse followed by a positive pulse when reading a negative break, and a zero level signal when reading said alternating signals, said read signal having a substantially greater peak-to-peak amplitude when reading a wide break than the amplitude of said signal when reading a narrow break,
means for detecting amplitude with respect to a predetermined threshold and polarity of said positive and negative pulses of said read signal,
means responsive to said detection means and also responsive to said positive and negative pulses for determining a zero-crossing point defining the transition between said positive and negative pulses and for providing zero-crossing pulses,
clock means responsive to said zero-crossing pulses for generating a clock signal phase-locked thereto, means responsive to said phase-locked clock for determining the center of a break, and providing a pulse signal corresponding thereto, means responsive to said break pulse signal for providing a delayed clock pulse synchronized with said input binary bits, means responsive to said phase-locked clock and said detector means for discriminating said wide breaks from said narrow breaks, means responsive to said phase-locked clock and said detector means for determining the polarities of said detected positive and negative pulses of said read signal, thereby providing a break width signal and break polarity signal respectively, and remapping means responsive to said break width signal, said break polarity signal, and said delayed clock pulse for recovering the binary data corresponding to said breaks and remapping said data into said input binary bit format.

* * * * *